March 30, 1965  R. LEE ETAL  3,175,854
NUCLEAR REACTORS

Filed Jan. 8, 1962  4 Sheets-Sheet 1

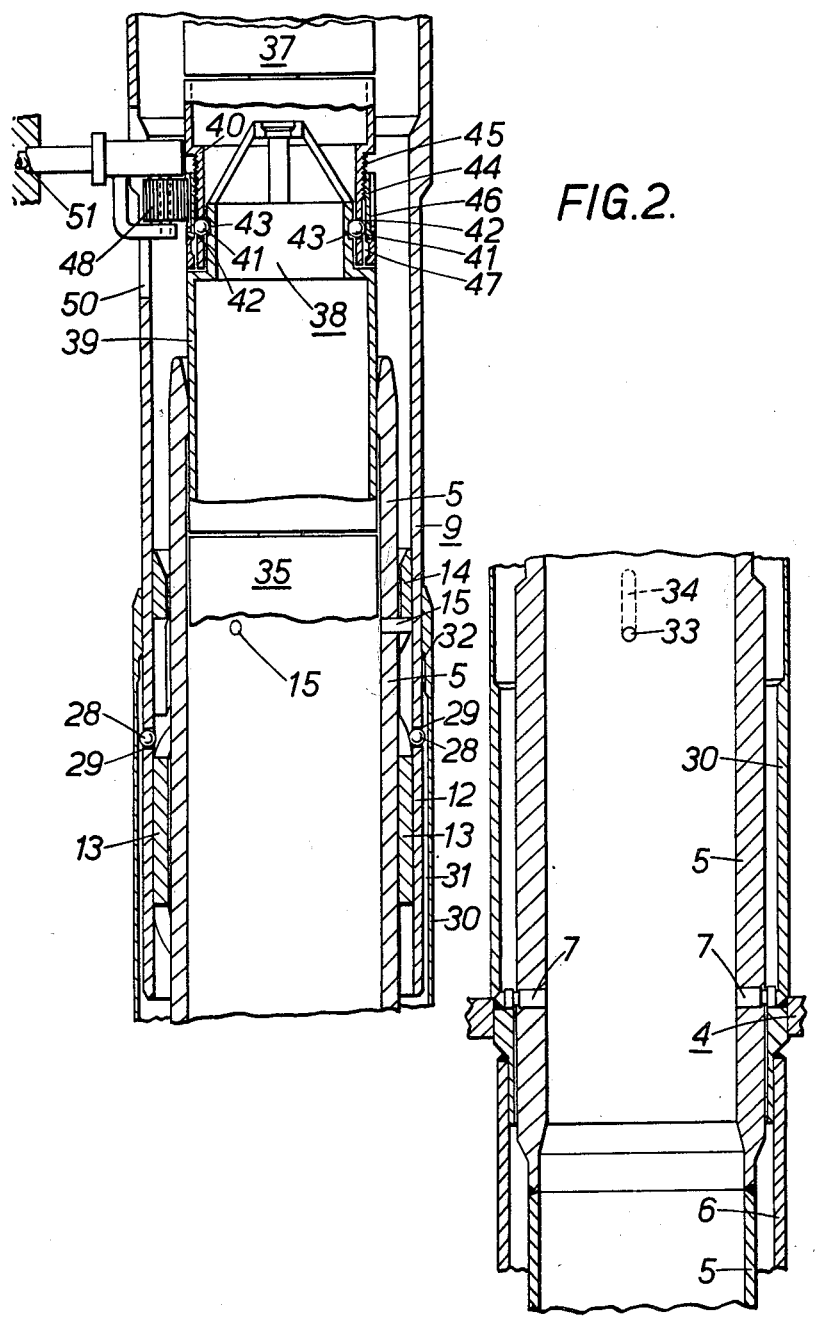

March 30, 1965 R. LEE ETAL 3,175,854
NUCLEAR REACTORS
Filed Jan. 8, 1962 4 Sheets-Sheet 3
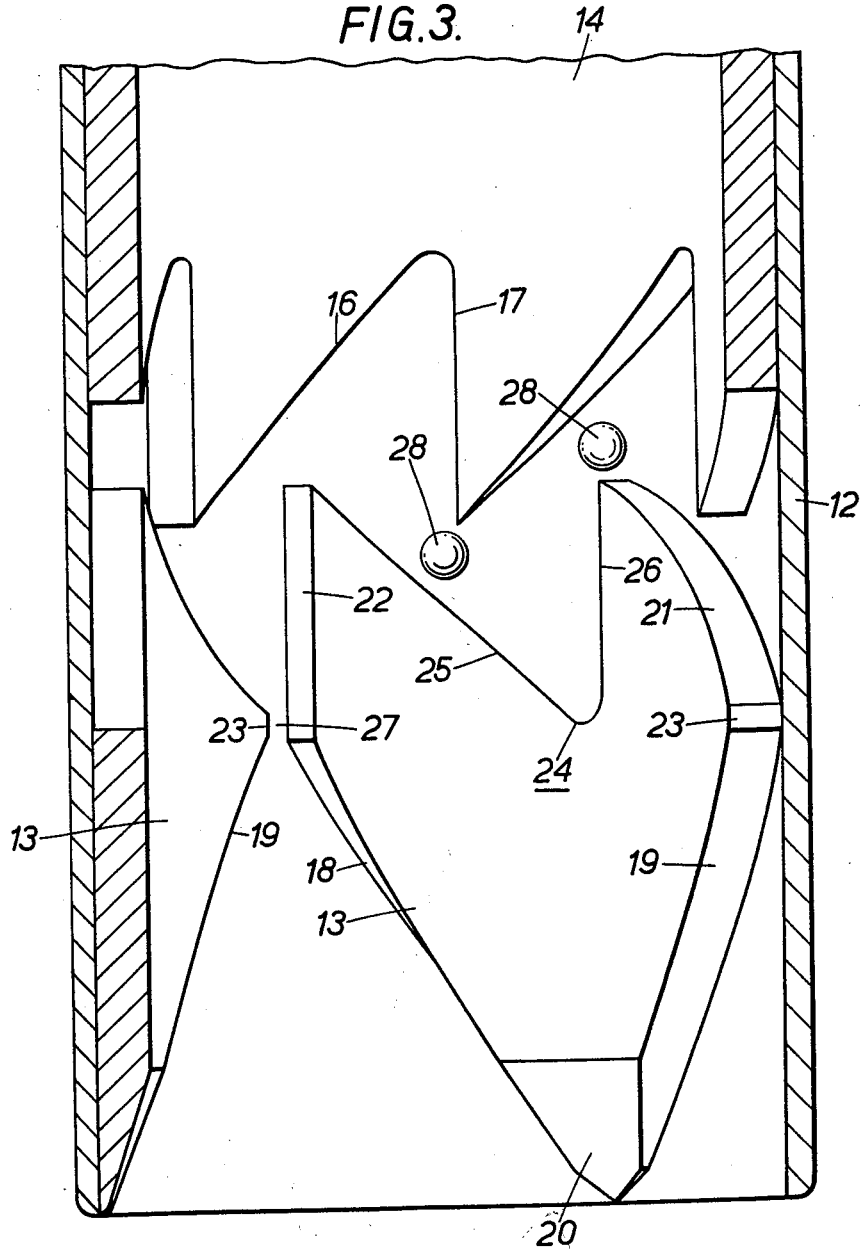

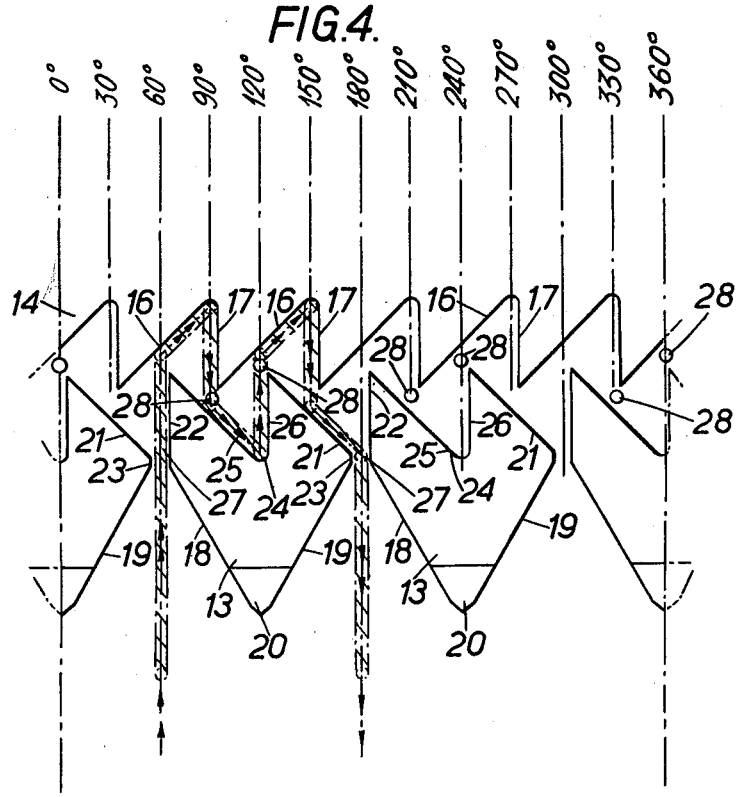

United States Patent Office 3,175,854
Patented Mar. 30, 1965

3,175,854
NUCLEAR REACTORS
Ralph Lee, Culcheth, near Warrington, and Dennis James Dawson, Bowden, England, assignors to the United Kingdom Atomic Energy Authority, London, England
Filed Jan. 8, 1962, Ser. No. 165,988
Claims priority, application Great Britain, Jan. 9, 1961, 793/61
1 Claim. (Cl. 294—83)

This invention relates to nuclear reactors. In one proposed design of nuclear reactor the fuel elements occupying each channel in the reactor core structure are connected in a train or string end to end with each other and with neutron and biological shield plugs. The complete string assembly of fuel elements and shield plugs is moved into and out of the reactor core structure as a single unit. The string of fuel elements and shield plugs is lifted from the channel in the reactor core structure into a movable discharge machine located on the reactor charge face which is formed by concrete biological shielding above the reactor core structure. The discharge machine containing the string of fuel elements etc. is moved into a position on the charge face from which the string can be lowered into a suspended position in a connecting passageway leading vertically through the biological shielding of the reactor to a biologically shielded transit station. The string of fuel elements is detached from the shield plugs in the passageway and the fuel elements are lowered into the transit station while the shield plugs remain suspended from the upper end of the passageway. The string of fuel elements is held in the transit station to await removal for breaking down and subsequent chemical processing or for recharging to a different position in the reactor core structure.

The transit station is in the form of a rotatable magazine fitted with transporter tubes each adapted to contain a complete string of fuel elements. In order to move a string of fuel elements from the discharge machine into the transit station a grab is required to be lowered from a position in the connecting passageway to engage with a transporter tube in the transit station, the transporter tube is required to be raised up into the passageway so that the string of fuel elements and shield plugs can be lowered until the string of fuel elements is contained in the transporter tube which can then be lowered with the contained string of fuel elements, after detachment from the shield plugs, back into position in the transit station.

It is an object of the invention to provide a grab suitable for carrying out the above required operation of engaging and lifting a tubular container and allowing passage of articles through the grab into the tubular container and accordingly such a grab comprises a tubular body, an assembly of coupling members and an assembly of engageable members carried one by the tubular body and the other by the tubular container said coupling members being of the sequentially operating type in that firstly by lowering of the tubular body of the grab to locate with the upper end of the container when said container is in an independently supported position and then raising the grab relatively to the independently supported container, coupling is effected between the tubular body of the grab and the container by engagement of the coupling and engageable members and secondly by lowering the container again to said independently supported position, further lowering of the tubular body of the grab relatively to the independently supported container and then raising the tubular body of the grab, uncoupling of the tubular body of the grab and the container is effected by disengagement of the coupling and engageable members, characterised in that a locking device is provided for preventing the uncoupling sequence occurring whilst the container is supported by the tubular body of the grab, holding means being provided for holding the locking device in the locking position whilst the container is supported by the tubular body of the grab, said holding means being rendered inoperative, to release the locking device from the locking position, by contact with a detent whilst the tubular container is in said independently supported position.

One embodiment of the invention will now be described by way of example with reference to the accompanying drawings in which:

FIG. 2 is a longitudinal sectional elevation in two parts (shown side by side) showing a grab in greater detail.

FIG. 3 is a detail in sectional elevation of part of the grab shown in FIG. 2.

FIG. 4 is a development of the internal surface of that part of the grab shown in FIG. 3.

Figure 1:
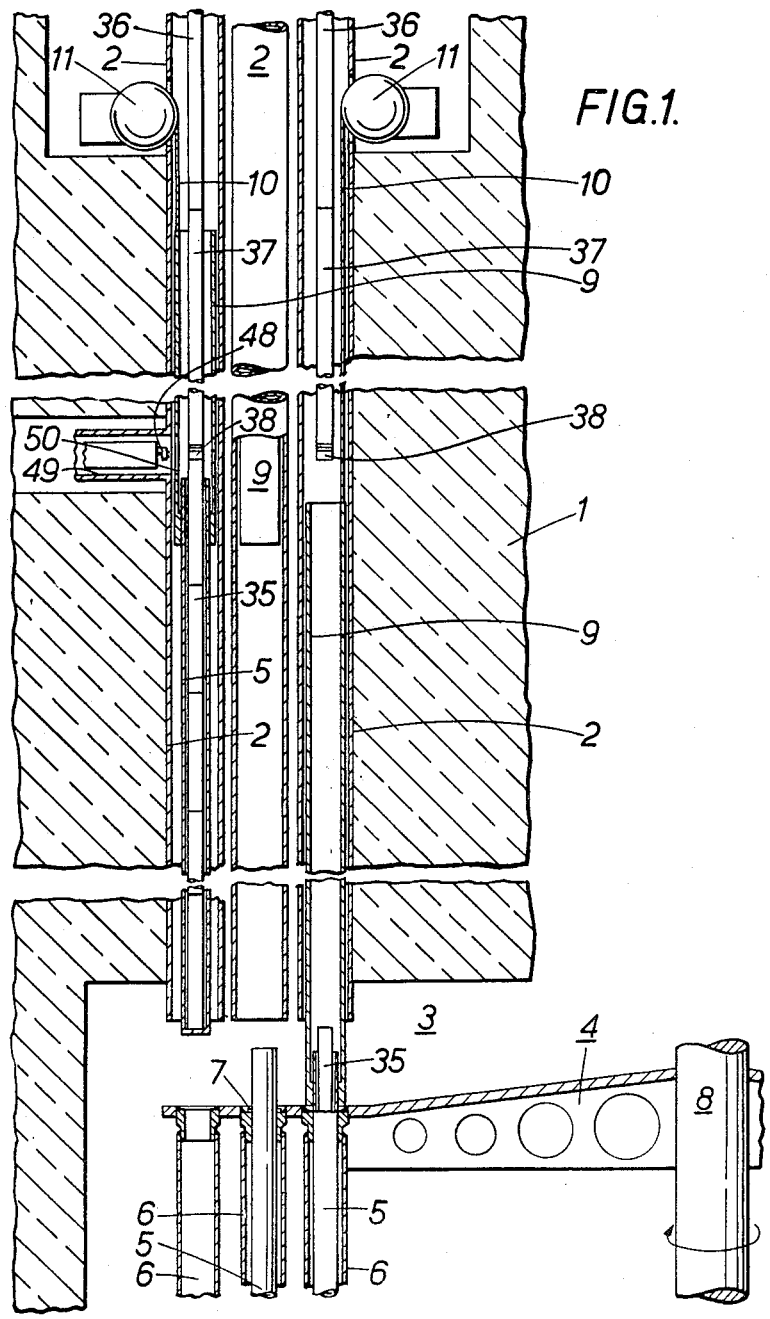
FIG. 1 is a general elevation of part of the structure of a nuclear reactor including grabs in accordance with the invention.

Referring to FIG. 1 of the drawings there is shown part of the concrete biological shielding 1 of a nuclear reactor. Three vertical tubes 2 provide connecting passageways leading from the upper face (not shown) of the shielding 1 terminating in a chamber 3 in the shielding 1. The chamber 3 contains a rotatable magazine 4 for the storage in transit of strings of fuel elements which have been discharged from the reactor. The magazine 4 provides accommodation for a series of transporter tubes 5 which are supported in three concentric circles around the periphery of the magazine 4 in tubes 6. The transporter tubes 5 project upwards from the tubes 6 each being fitted with two diametrically opposed shear pins 7 (FIG. 2) by means of which the transporter tubes are suspended in the corresponding tubes 6 of the magazine 4. The magazine 4 is rotatable about a vertical axis so that by indexing the magazine 4 any one of the transporter tubes 5 can be brought into alignment below the corresponding tube 2 in the shielding 1. Each tube 2 contains a grab 9 of tubular form, each grab 9 being movable upwards and downwards in the corresponding tube 2 by means of a cable 10 attached to a winch 11.

As shown in FIG. 2 each grab 9 has a tubular body 12 fitted internally with an assembly of coupling members comprising three sequence cams 13 and a single sequence cam 14 which co-operate to engage with an assembly of engageable members comprising three equispaced pins 15 projecting radially from the upper end of each transporter tube 5. As shown in FIGS. 3 and 4 the three sequence cams 13 are in the form of identical segments, arranged symmetrically around the inside of the tubular body 12 below the single sequence cam 14. The single sequence cam 14 has a saw toothed lower edge with inclined faces 16 and vertical faces 17. The three sequence cams 13 have lower inclined faces 18 and 19 coming to a lower point 20, an upper inclined face 21, a vertical face 22, a short vertical face 23, between the upper and lower inclined faces 21 and 19, and an upper V-notch 24 having an inclined face 25 and a vertical face 26. The vertical faces 22 and 23 of adjacent cams 13 are spaced apart to provide spaces 27 between the cams 13 at the point of convergence of the lower inclined face 19 of each cam and the lower inclined face 18 of the adjacent cam. The cams 13 and 14 are fixed inside the tubular body 13 of the grab 9 by screws and are then plug welded.

Referring again to FIG. 2, the grab body 12 is fitted with six locking balls 28 located in internally lipped holes 29 in the grab body 12. The balls 28 are located at the positions shown in FIG. 4 between the cams 13 and 14. An external sleeve 30 slidably attached to the grab body 12 extends some distance below the lower open end of the body 12. The sleeve 30 which controls the position of the balls 28 in the holes 29 has a main bore section 31 of sufficient diameter to allow the balls 28 to rest back in the holes 29 and a minor bore section 32 of smaller diameter to hold the balls 28 projecting from the holes 29 inside the grab body 12.

The longitudinal movement of the sleeve 30 on the grab body 12 is kept between upper and lower limits by a pin 33 fitted on the body 12 and engaging with a longitudinal slot 34 in the sleeve 30.

In order to move a string of fuel elements 35 (FIG. 1) from the discharge machine on the upper face of the shielding 1 down one of the tubes 2 into a transporter 5 supported independently of the grab 9 in the rotatable magazine 4, the corresponding grab 9 is lowered from a raised position in the tube 2 (i.e. from a position corresponding to the position occupied by the grab 9 of the centre tube 2 in FIG. 1) to a position in engagement with the corresponding transporter tube 5 in the rotatable magazine 4.

Before the lower open end of the grab body 12 engages with the upper end of the transporter tube 5, which is in alignment with the tube 2, the lower end of the grab locking sleeve 30 contacts the upper face of the rotatable magazine 4 which acts as a detent arresting further downwards movement of the sleeve 30. Thus as the grab 9 is further lowered to engage with the transporter tube 5 the sleeve 30 slides relatively upwards on the grab body 12 bringing the main bore section 31 of the sleeve 30 into alignment with the balls 28 which are then free to move back into the holes 29 in the grab body 12 and therefore cannot interfere with the subsequent engagement of the grab 9 with the transporter tube 5.

The grab 9 engages with the transporter tube 5 by co-operation between the sequence cams 13 and 14 and the radial pins 15 projecting from the transporter tube 5. The sequence of engagement of the pins 15 with the cams 13 and 14 is as shown by the shaded path in FIG. 4 which indicates the sequence of movements made by one of the pins 15, it being understood that the remaining two pins 15 operate in a similar manner. As the grab 9 is lowered relatively to the fixed transporter tube 5, so that the mouth of the grab body 12 embraces the upper end of the transporter tube 5, the pin 15 passes relatively upwards through the space 27 between the two adjacent sequence cams 13 until the pin 15 contacts that inclined face 16 of the single sequence cam 14 immediately above the space 27. On further lowering the grab 9 is forced by the inclined face 16 to rotate anticlockwise through 30° relative to the transporter tube 5 until the pin 15 rests at the base of the V-notch in the cam 14 formed by the inclined face 16 and the corresponding vertical face 17. (In FIG. 2 the grab 9 and transporter tube 5 are shown in relative positions corresponding to this condition of engagement.) The grab 9 is now raised relatively to the transporter tube 5 so that relative movement of the pin 15 occurs away from the base of the V-notch in the cam 14 and down the vertical face 17 of the cam 14 until the pin 15 contacts the inclined face 25 of the V-notch 24 in the corresponding sequence cam 13. By continued raising of the grab 9 the transporter tube 5 is partially lifted and is forced to rotate clockwise relatively to the grab 9 by the inclined face 25 of the V-notch 24. The transporter tube 5 rotates through about 30° until the pin 15 rests in the base of the V-notch 24 in the sequence cam 13. The transporter tube 5 is now raised with the grab 9, the pins 15 being engaged in the bases of the V-notches 24 in the sequence cams 13. As the grab 9 is raised the grab locking sleeve 30 slides downwards on the grab body 12 bringing the minor bore section 32 of the sleeve 30 into alignment with the balls 28. Thus the balls 28 are forced inwards to project from the holes 29 inside the grab body 12. The projecting of the balls 28 inside the grab body 12 prevents movement of the pins 15 out of the V-notches 24 in the sequence cams 13 while the transporter tube 5 is suspended from the grab 9. Such movement of the pins 15 from engagement with the notches 24 might occur particularly should the transporter tube 5 become jammed whilst being lowered down again into the magazine 4. The projecting balls 28 prevent disengagement of the grab 9 and transporter tube 5 whilst the transporter tube 5 is suspended from the grab 9.

The transporter tube 5 is raised by the grab 9 up the tube 2 to a position corresponding to the position occupied by the transporter tube 5 in the left hand tube 2 in FIG. 1. A string of fuel elements 35 attached below a biological shield plug 36 and neutron shield plug 37 (FIG. 1) is now lowered from the discharge machine through the tube 2 and passes through the grab body 12 into the raised transporter tube 5. The fuel element string 35 is contained by the transporter tube 5 while the shield plugs 36 and 37 project upwards above the transporter tube 5 through the grab body 12. The neutron shield plug 37 is attached to the upper end of the string of fuel elements 35 by a coupling 38 which has to be uncoupled prior to lowering the transporter tube 5 with the contained string of fuel elements 35 down into the rotatable magazine 4 while leaving the biological shield plug 36 and neutron shield plug 37 suspended from the upper end of the tube 2.

The coupling 38 as shown in FIG. 2 comprises a cylindrical distance piece 39 linked to the upper fuel element 35 of the string of fuel elements and coupled with a tube 40 which is linked to the neutron shield plug 37. The distance piece 39 is of reduced diameter at its upper end to fit in the tube 40 and is releasably connected to the tube 40 by six equispaced balls 41 located in apertures 42 in the tube 40 and engaging an annular groove 43 around the distance piece 39. A sleeve 44 encircles the tube 40 and retains the balls 41 in the groove 43 to couple the distance piece 39 to the tube 40. The sleeve 44 which is internally screw threaded to engage an external screw thread 45 on the tube 40 also has a ring of external gear teeth 46 and an internal groove 47 which registers with the apertures 42 in the tube 40 thereby allowing separation of the tube 40 and the distance piece 39 when the sleeve 44 is partially unscrewed from the tube 40. The apertures 42 are internally lipped to limit inward movement of the balls 41 beyond the position shown in FIG. 2.

In operation to uncouple the string of fuel elements 35 from the neutron shield plug 37 and its connected biological shield plug 36 a driven gear member 48 (FIG. 2) is introduced through an access passage 49 (FIG. 1) connecting laterally with the tube 2 to engage the gear member 48 with the external gear teeth 46 on the sleeve 44, the grab body 12 having an aperture 50 allowing access to the coupling 38. The gear member 48 is rotated by means of a shaft 51 (FIG. 2) so as to paritally unscrew the sleeve 44 from the tube 40 of the coupling 38. When the internal groove 47 of the sleeve 44 registers with the apertures 42 in the tube 40 the balls 41 are releasable from the annular groove 43 around the distance piece 39 and the string of fuel elements 35 can be lowered inside the transporter tube 5 down into the rotatable magazine 4 leaving the biological shield plug 36 and attached neutron shield plug 37 suspended from the upper end of the tube 2 until subsequently removed to make the tube 2 re-available for further operation.

As the transporter tube 5 is lowered the grab locking sleeve 30 again contacts the upper face 1 of the magazine 4 and is arrested relatively to the body 12 of the grab 9. Thus the sleeve 30 slides upwards relatively to the grab body 12 bringing the main bore section 31 of the sleeve 30 into alignment with the balls 28. Therefore the balls 28 are freed to move back into the holes 29 of the grab 9 so that the unlatching sequence can proceed. The grab 9 and transporter tube 5 are further lowered until the transporter tube 5 comes to rest in the magazine 4 suspended from the shear pins 7. Referring again to that pin 15 the path of which is shown in FIG. 4 continued lowering of the grab 9 relatively to the fixed transporter tube 5 causes the pin 15 to move away from the base of the V-notch 24 in the sequence cam 13 and to move up the vertical face 26 of the V-notch 24 until the pin 15 contacts that inclined face 15 of the single sequence cam 14 immediately above the V-notch 24. On further lowering the grab 9 is forced to rotate anticlockwise through 30° relative to the transporter tube 5 until the pin 15 rests at the base of the V-notch in the cam 14 formed by the inclined face 15 and the corresponding vertical face 17. The grab 9 can now be raised to disengage from the transporter tube 5. Raising of the grab 9 relatively to the transporter tube 5 causes the pin 15 to move away from the base of the V-notch in the cam 14 down the vertical face 17 until the pin 15 contacts the upper inclined face 21 of the corresponding sequence cam 13. Continued raising forces the grab 9 to rotate anticlockwise through 30° relatively to the transporter tube 5 and the pin 15 passes down through the space 27 between the two adjacent cams 13 allowing disengagement of the grab 9 from the transporter tube 5, when the grab can be lifted to its raised position in the tube 2.

We claim:

An improvement in a grab of the known sequentially operating type suitable for engaging and lifting a tubular container and allowing passage of articles through the grab into the tubular container, such grabs comprising a tubular grab body, an assembly of coupling members carried by the tubular grab body and an assembly of engageable members carried by the tubular container, said coupling members carried by the grab body defining a track along which the engageable members carried by the tubular container move during coupling and uncoupling of the tubular container and the grab body, said track having entry points, exit points and having lifting positions between the entry and exit points, coupling of the grab body with the tubular container being effected by lowering of the grab body to locate with the container when in an independently supported position and then by raising of the grab body relatively to the independently supported container so that the engageable members on the container move into the track in the grab body through the entry points and then along the track to the lifting positions, uncoupling of the grab body and the tubular container being effected by lowering the container to an independently supported position, further lowering of the grab body relatively to the independently supported container followed by raising of the grab body relative to the container so that the engageable members carried by the tubular container move along the track in the grab body from the lifting positions to the exit points from the track and then out of the exit points from the track, the improvement in such a grab being in the provision of a locking device for preventing the uncoupling of the body of the grab and the container while the container is supported by the grab, said locking device comprising a series of locking balls housed in holes in the grab body and located at positions in the track in the grab body between the lifting positions and exit points of the track, said balls either occupying a locking position projecting into the track in the grab body or occupying an inoperative non-locking position resting back in the holes in the grab body and out of the track holding means being provided for holding the locking balls in the locking position when the tubular container is supported from the body of the grab, said holding means comprising a sleeve slidable on the grab body and having an upper narrow portion in its internal bore and a lower wide portion in its internal bore the upper narrow portion of the internal bore of the sleeve holding the locking balls projecting from the holes in the grab body in the locking position when the sleeve is in a dropped position on the grab body with the container supported from the grab body, the lower wide portion in the sleeve allowing the locking balls to rest back in the holes in the grab body in the non-locking position when the sleeve is held in a raised position on the grab body by contact with a detent when the container is supported independent of the grab body in a required position.

References Cited in the file of this patent
UNITED STATES PATENTS

| | | |
|---|---|---|
| 1,425,525 | Hollick | Aug. 15, 1922 |
| 3,065,011 | De Pew | Nov. 20, 1962 |
| 3,072,430 | Fahrenwald | Jan. 8, 1963 |